Nov. 29, 1938. G. HUNT 2,138,169
CLUTCH
Filed Feb. 27, 1937 4 Sheets-Sheet 1

Inventor
George Hunt
By Blackmore, Spencer & Fink
Attorneys

Nov. 29, 1938.   G. HUNT   2,138,169
CLUTCH
Filed Feb. 27, 1937   4 Sheets-Sheet 2

Inventor
George Hunt
By Blackmore, Spencer & Flint
Attorneys

Nov. 29, 1938.   G. HUNT   2,138,169
CLUTCH
Filed Feb. 27, 1937   4 Sheets-Sheet 3

Inventor
George Hunt
By Blackmore, Sauser & Flint
Attorneys

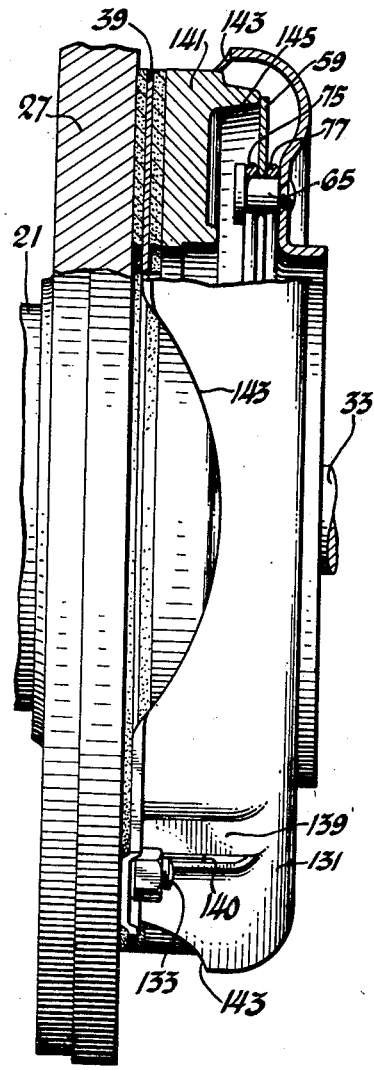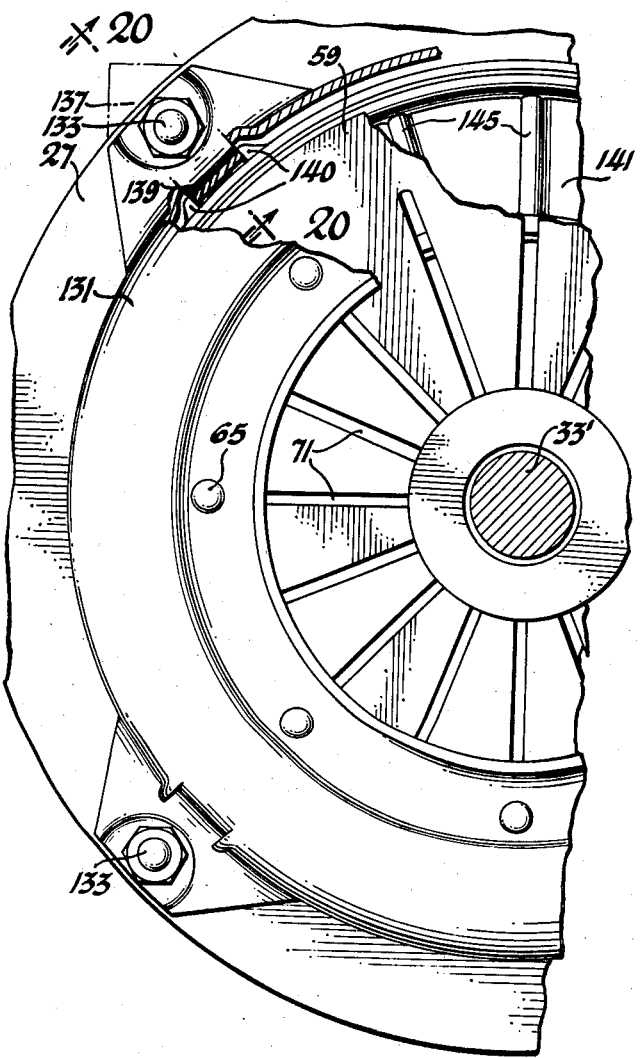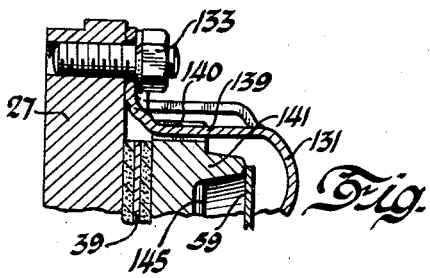

Patented Nov. 29, 1938

2,138,169

UNITED STATES PATENT OFFICE 2,138,169

CLUTCH

George Hunt, Dayton, Ohio, assignor to General Motors Corporation, Detroit, Mich., a corporation of Delaware Application February 27, 1937, Serial No. 128,177

18 Claims. (Cl. 192—68)

This invention relates to friction clutches and is intended more particularly for use between the engine and the transmission shaft of a motor vehicle.

The novel features herein disclosed are intended more particularly for use with a clutch spring of the Belleville type.

One object of the invention is to provide an improvement in the operation of the clutch of the kind referred to.

Other objects concern maximum efficiency, durability, ease of operation and low cost of manufacture.

Still other objects relate to the improved details in the assembly of the parts of such a clutch employing the Belleville spring.

The invention is illustrated in the accompanying drawings wherein.

Figure 11:
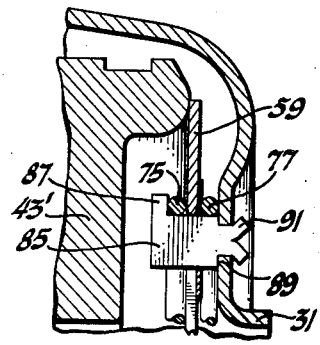

In Fig. 11 is illustrated a transverse section of a modified form of connection between the spring and the flywheel cover.

Figure 12:
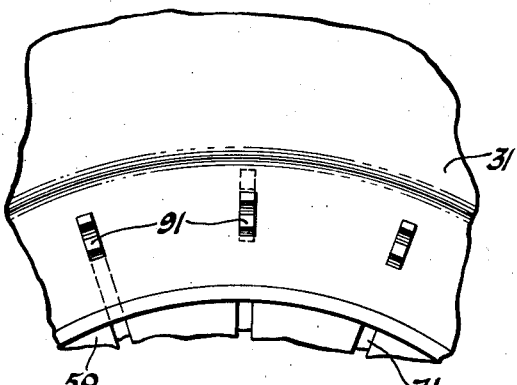

Figure 12 is a view in elevation of the invention shown by Figure 11.

Figure 13:
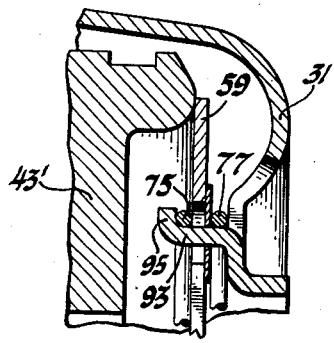

Fig. 13 is a view corresponding to Figure 11 showing a modified connecting means.

Figure 14:
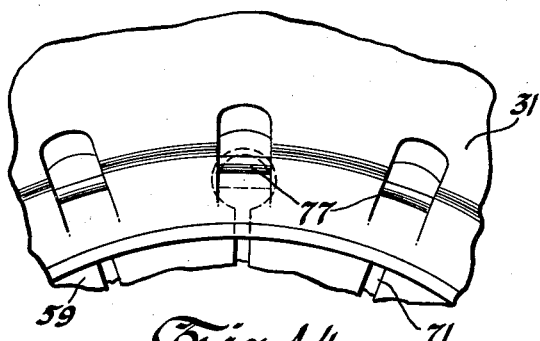

Figure 14 is a view in elevation illustrating the invention shown by Figure 13.

Figure 15:
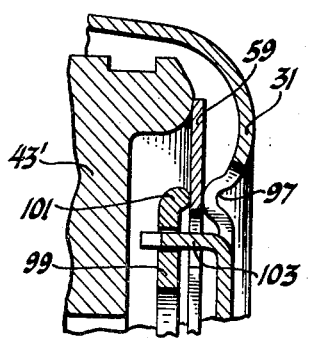

Figure 15 is a view in section of still another form of connection between the cover and the clutch spring.

Figure 4:
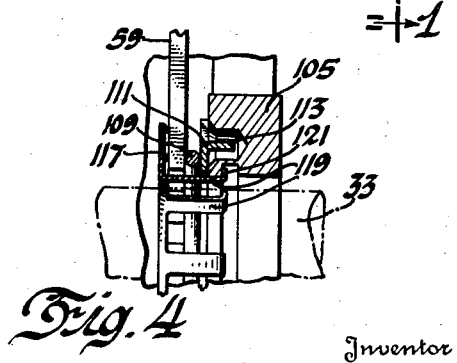
Figure 4 is a view in section of a detail showing means for connecting the inner part of the clutch spring with the throwout collar.
Figure 5:
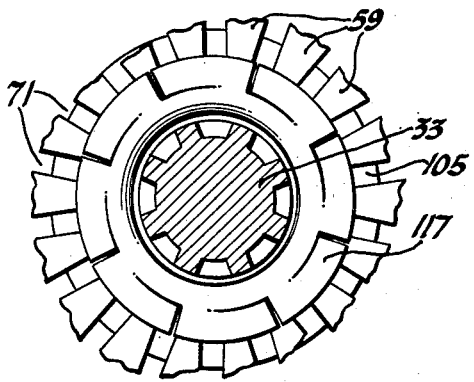
Figure 5 is a view as seen from 5—5 of Figure 1.
Figure 16:
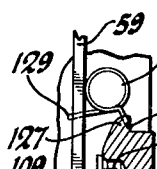

Figure 16 is a view much like Figure 4 but showing a modified form of spring resiliently connecting the main clutch spring with the throwout collar.

Figure 17:
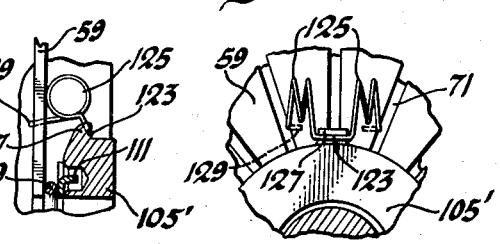

Figure 17 is a view in elevation of the invention illustrated in Figure 16.

Figure 18 is an edge view partly broken away and in section of a clutch having a modified form of cover or housing.

Figure 19 is a view in elevation of the invention shown in Figure 18.

Figure 20 is a sectional view substantially on line 20—20 of Figure 19.

Referring by reference characters to the drawings and first to that form of the invention shown by Figures 1 to 5, numeral 21 is used to designate the engine crank shaft. This crankshaft has a flange 23 to which there is secured by fastening means 25, any convenient form of flywheel 27. Numeral 29 is used to represent the fastening means for securing to the flywheel a cover or housing 31. This housing is of cup-shape, serves to enclose the elements of the clutch and acts as a reaction abutment for the clutch spring. A transmission shaft 33 extends through the cover 31 and into the enclosure formed by the flywheel and cover. The transmission shaft 33 is arranged co-axially with the engine shaft 21 and may be piloted therein as shown by 35. Non-rotatably mounted on transmission shaft 33 is a hub 37 to which is secured a driven plate 39 carrying any preferred or conventional facings 41.

At 43 is a pressure plate adapted to be moved axially to grip the driven plate between itself and the face of the flywheel. As is usual, the pressure plate is designed to rotate jointly with the flywheel. To transmit the driving torque from the flywheel to the pressure plate, the latter is formed with a plurality of slots or keyways 45 to receive driving studs 47. These studs may conveniently extend through the peripheral region of the cover and be secured thereto in any convenient way. Obviously the pressure plate slots are shaped to permit axial movement of the pressure plate to and from clutch engaging position.

Figure 7:
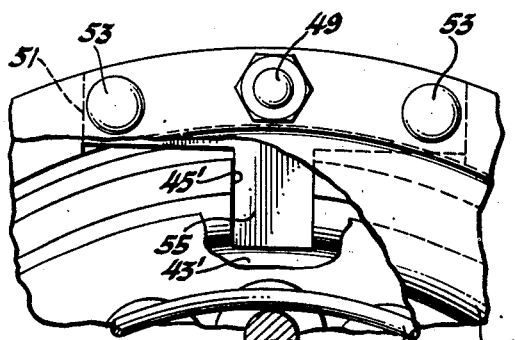
Figure 7 is a view in elevation showing a modified form of the driving connection for the pressure plate.
Figure 8:
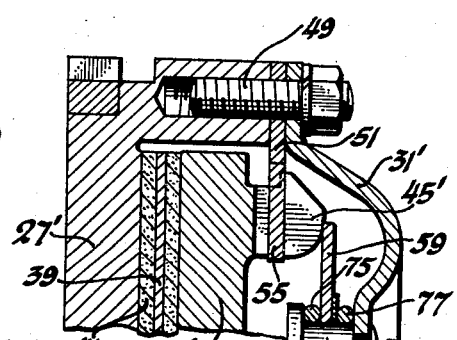
Figure 8 is a sectional view of that form of the invention illustrated by Figure 7.

In Figures 7 and 8 is shown a second arrangement by which the movement of rotation of the flywheel and its cover may be communicated to the pressure plate. In this form of the invention the flywheel 27' and the cover 31' are secured together by any suitable fastening means 49. Suitable rivets 53 serve to secure plates 51 to the flywheel and housing 31'. If preferred, these plates may be secured to the cover 31' in any other way as by welding. The plates 51 are formed with tongues 55, these tongues entering slots 45' of the pressure plate 43'. It will be understood that the rotation of the flywheel and cover is transmitted by means of the members 55 to the pressure plate in substantially the same way as the motion was transmitted by the studs 47 in the form previously described.

Figure 9:
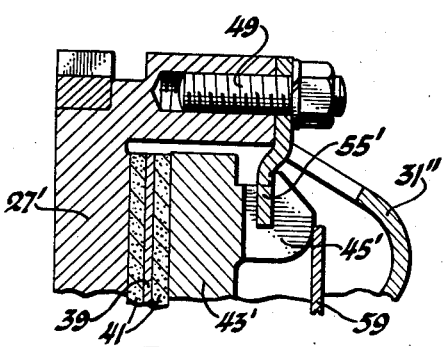
Figure 9 is a sectional view corresponding to that of Figure 8 but showing a modified form for connecting the driving member with the pressure plate.

In Figure 9 the housing 31'' is formed with integral tongues 55' entering slots 45' of the pressure plate 43', this form being in other respects, like that of Figure 8.

Figure 10:
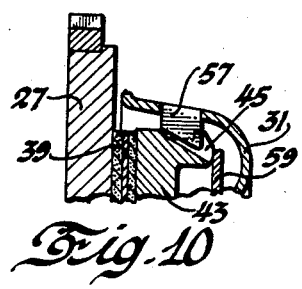
Figure 10 is a similar sectional view of still another form of connection.

Figure 10 shows still another modification. In this form of the invention, from the wall of housing 31, is bent an integral tongue 57. This tongue enters a slot 45 in the pressure plate and serves to position and drive the latter.

Figure 1:
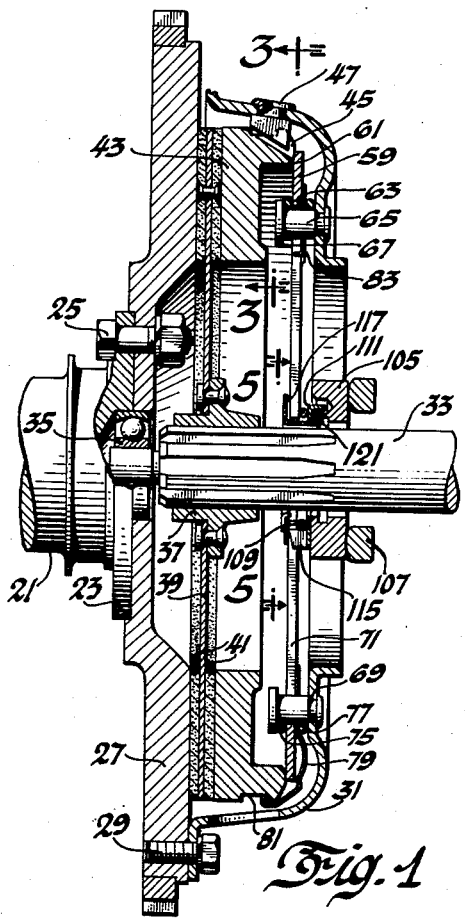
Figure 1 shows a transverse section on line 1—1 of Figure 2, of one embodiment of clutch employing my improved mechanism.
Figure 2:
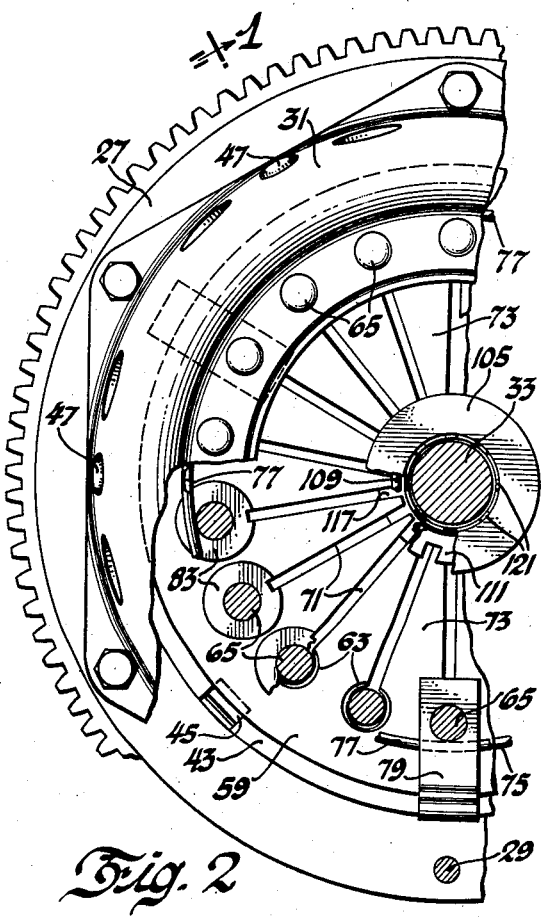
Figure 2 shows the same embodiment in elevation with parts broken away and sectioned.
Figure 3:
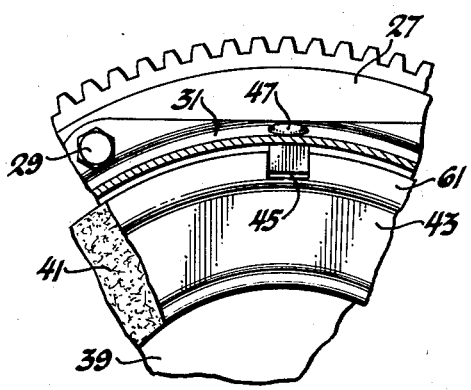
Figure 3 is a view as seen from line 3—3 of Figure 1.

The spring intended to be used in this clutch takes the form of a bowed annulus or cone 59 of the Belleville type. Its outer peripheral edge engages the pressure plate as shown by numeral 61. The spring is provided with a circular series of openings 63 formed to surround rivets or pins 65 carried by the housing 31. The rivets are formed with heads 67 on their ends remote from the cover. They are also formed with shoulders 69 engaging the cover. Inwardly from the holes 63 of the spring are radial slots 71 forming between them a series of spring fingers 73. Two continuous rings 75 and 77 surround the series of pins 65, one ring being located between the spring 59 and the heads 67, and the other ring being between the spring 59 and the cover 31 adjacent the shoulders 69. Stampings 79 are located on certain ones of the pins 65, these stampings being positioned between the spring 59 and the ring 77. They are retained by means of openings in the stampings surrounding the pins. These stampings 79 are shaped, as shown in Figure 1, their outer ends being hooked into recesses 81 in the pressure plate to the end that axial movement of the periphery of the spring 59 will move the pressure plate positively away from the driven plate 39. On those of the pins which do not carry stampings 79, there are placed spacers 83 corresponding in thickness to the stampings 79 and designed to similarly space the spring 59 from the ring 77. It should be explained that the spring 59 is of bowed or conical form when unstressed. It is unbroken by any openings in the region between its contact with the pressure plate and its circular contact with the cover defined by pins 65. When assembled in the clutch, the cone is somewhat flattened and the spring stressed so that it exerts pressure upon the ring 77 and, by reaction, upon the periphery of the pressure plate at 61. To release the pressure, the spring is additionally stressed by being pressed against the ring 75. This relieves the pressure upon the pressure plate. In thus fulcruming about ring 75, the outer edge moves to the right (Figure 1) and the stamping 79 positively moves the pressure plate and releases the grip upon the driven plate.

. Other means for connecting the spring and the cover may be employed. In place of the pin 65, Figure 11 shows a clip 85 of flat steel having a lug 87 adapted to engage the ring 75. It also has a shoulder 89 to engage the cover or housing 31 and the end of the stamping is split and spread as at 91 to hold it securely to the cover.

Figure 13 shows a slight modification of the means for securing the spring relative to the cover 31. The cover is formed with a lug 93 constituting an integral part thereof. This lug engages the ring 75 by means of a turned up end 95.

Still another modification is shown by Figure 15. In this form, the cover is formed with a bead 97, the bead positioned to engage the spring 59. The bead provides a small rounded area as a bearing point for the spring. There is also used a ring 99 having a flange 101 with a rounded edge for contact with the spring. A plurality of lugs 103 are bent out of the housing 31 and extend through openings in the spring and the inner ring 99. The inner ends of parts 103 are spread to engage the ring 99 as shown, the spreading being like that shown at 91 in Figure 11.

Figure 6:
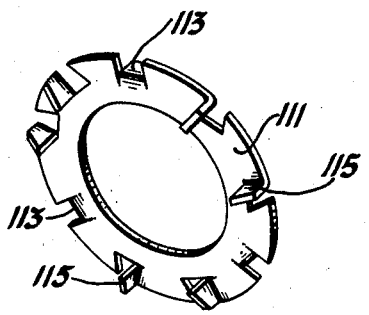
Figure 6 is a perspective of a detail used in the assembly of the clutch spring and the throwout collar.

For the purpose of clutch release, a throwout collar 105 may be reciprocated toward the flywheel by means of the forked ends 107 of a conventional throwout lever. A continuous bearing ring 109 of steel wire, engages the inner ends of the spring fingers 73 on one side and a collar 111 contacts the other side of this ring. The collar 111 has locating lugs 113 turned axially into openings in the throwout collar 105. It also has lugs 115 (see Figures 1 and 6) extending between some of the fingers of the spring 59. These lugs serve to hold the collars 105 and 111 in correct relation to each other and to the spring 59. To retain these several parts in assembled relation, a stamping made from spring steel is used. The stamping has an annular flange 117 engaging the fingers of the spring and axial fingers 119 extending through the opening at the center of the spring and into the central opening of the collar 105 where radial fingers 121 are yieldingly snapped into an opening in the collar 105.

As a substitute for the spring stamping comprising parts 117, 119, and 121, there may be used a double coil spring as shown in Figures 16 and 17. In this form of the invention a junction part 123 between two spaced coils 125 engages a hooked part 127 of the throwout collar 105'. The ends of the coils are bent over and engage the rear side of the main clutch spring fingers as shown at 129. In this case there is used the same ring 109 and collar 111, described above.

Figures 18, 19 and 20 show another modification. In this form the cover 131 instead of being of hexagonal shape, is made from a stamping in the form of a square. Being of square configuration, there is no waste in cutting it from metal stock of the required width. The plate is shaped to cup form so that it may house the driven part of the clutch and is secured by four fastening means 133 at the four corners of the square. Small triangular pieces 137 are removed, one at each corner. The total loss of material is constituted by these four small triangular pieces and the material for making the cover is thus very advantageously used. The rounded part of the cover may be slotted to form tongues 139 adapted to engage slots 140 in the pressure plate 141 whereby the latter rotates jointly with the flywheel. The cover is shown having openings 143 which serve to facilitate cooling. The pressure plate may, if desired, be formed with ribs 145 to act like a fan and expel the air heated by the friction of the parts of the clutch. In other respects, this form of the invention is like the form already described.

I claim:

1. In a friction clutch, a driving member having a friction face, a cover secured to said driving member, a pressure plate, a driven member between said driving member and pressure plate, a pre-stressed Belleville spring to move said pressure plate towards said driving member, said spring having a peripheral circular region of contact with said pressure plate, means to connect said cover plate to said spring in a substantially circular line, radially within the circular region of contact with the pressure plate, said means comprising a circular series of headed elements carried by said cover, said spring having apertures to embrace said elements and fulcrum rings positioned about said elements on opposite sides of said spring, and means additionally to stress said spring to release the clutch.

2. The invention defined by claim 1, the Belleville spring adapted to exert a reaction pressure on the ring adjacent the cover when the clutch is engaged, the other ring adapted to serve as a fulcrum for the spring when the clutch is being released.

3. The invention defined by claim 1, said headed elements being in the form of metal stampings each stamping having a lug at one end and secured to the cover at its other end.

4. The invention defined by claim 1, said elements constituted by tongues integral with the cover, extending through openings in the spring and having flanges or heads at their inner ends.

5. In a friction clutch, a driving member, a cover secured to said driving member, a pressure plate, a driven member between said driving member and said pressure plate, a Belleville spring to move said pressure plate toward said driving member, said spring having a peripheral circular region of contact with said pressure plate, means to connect said cover plate to said spring in a substantially circular line radially within the circular region of contact with the pressure plate, said means comprising a ring having a peripheral flange engaging said spring, said cover having a bead to engage said spring opposite said flange, said cover also having an integral tongue extending through openings in said spring and ring, said tongue being formed with a head to effect the assembly of the cover, spring and ring.

6. In a friction clutch, a driving member, a cover secured thereto and forming therewith a clutch enclosure, a driven member, a pressure plate and a normally bowed pre-stressed spring of the Belleville type within said enclosure, said spring engaging said pressure plate and cover in circular regions of contact and having radial fingers, a reciprocable throwout collar, means to secure said fingers to said collar, including a second collar having locating flanges engaging said throwout collar and spring fingers, and spring means to hold said throwout collar, second collar and fingers in assembled relation.

7. The invention defined by claim 6 together with a closed ring located between the inner ends of said fingers and said second collar.

8. The invention defined by claim 6 together with a closed ring located between the inner ends of said fingers and said second collar, said spring holding means having axial parts extending through co-axial openings of the Belleville spring and the two collars and radial parts engaging the Belleville spring fingers and the throwout collar.

9. The invention defined by claim 6 together with a closed ring located between the inner ends of said fingers and said second collar, said spring holding means having spaced coils and an intermediate connecting part, said last named part engaging a notch on the throwout collar and the ends of each coil having an extremity bent around a finger of the Belleville spring.

10. In a clutch, a flywheel, a cover secured thereto to form an enclosure, a driven plate and a pressure plate within said enclosure, clutch spring means anchored to said cover, said spring means engaging at its outer periphery said pressure plate and means to release the pressure of said spring means on said pressure plate, said anchoring means comprising a circular series of headed elements carried by said cover, two rings encircling said series of headed elements, said spring means constructed to embrace said headed elements between said rings whereby one or the other of said rings may serve as a reaction abutment.

11. The invention defined by claim 10, said spring means having fingers extending radially inward from said headed elements, and said pressure releasing means comprising a reciprocable collar connected to the inner ends of said fingers.

12. In a clutch, a driving member, a cover secured thereto, to form an enclosure, a driven member and a pressure plate within said enclosure, a clutch engaging spring in the form of a cone, said cone engaging along its periphery said pressure plate, a circular series of abutment elements carried by said cover, said spring being flattened and stressed to engage said abutments, said spring being formed with radial fingers within said abutments, and means to move said spring fingers toward the driving member to additionally stress said spring and release the clutch.

13. The invention defined by claim 12, together with means associated with said spring and certain of said abutment elements and the pressure plate to positively move the latter from the driven member when the clutch is released.

14. In a clutch, a flywheel, a cover plate secured thereto, a pressure plate, a spring engaging and adapted to reciprocate said pressure plate, said spring being a bowed annulus having a circular series of openings, supporting means for said annulus carried by said cover and extended through said openings and means to flex said spring to relieve its pressure on the pressure plate.

15. The invention defined by claim 14, the region of contact with said pressure plate being radially outward from said series of openings.

16. The invention defined by claim 14, the region of contact with said pressure plate being radially outward from said series of openings, said spring plate having radial slots extending inwardly from said series of openings.

17. The invention defined by claim 14, together with a ring carried by said supporting means to receive the reaction thrust of said spring.

18. The invention defined by claim 14, together with a ring carried by said supporting means to receive the reaction thrust of said spring and washers surrounding said supports and positioned between said spring and ring.

GEORGE HUNT.